(12) United States Patent
Peters

(10) Patent No.: US 7,487,466 B2
(45) Date of Patent: Feb. 3, 2009

(54) COMMAND LINE PROVIDED WITHIN CONTEXT MENU OF ICON-BASED COMPUTER INTERFACE

(75) Inventor: Johan C. Peters, Bad Schoenborn (DE)

(73) Assignee: SAP AG, Walldorf (DE)

( * ) Notice: Subject to any disclaimer, the term of this patent is extended or adjusted under 35 U.S.C. 154(b) by 306 days.

(21) Appl. No.: 11/319,436

(22) Filed: Dec. 29, 2005

(65) Prior Publication Data

US 2007/0157115 A1 Jul. 5, 2007

(51) Int. Cl.
*G06F 3/048* (2006.01)
(52) U.S. Cl. ........................ 715/808; 715/780
(58) Field of Classification Search ............... 715/808
See application file for complete search history.

(56) References Cited

U.S. PATENT DOCUMENTS

| | | | | |
|---|---|---|---|---|
| 5,729,682 | A * | 3/1998 | Marquis et al. | 709/229 |
| 5,953,523 | A | 9/1999 | Martinez et al. | 717/108 |
| 5,991,814 | A * | 11/1999 | Rzonca et al. | 709/237 |
| 6,606,101 | B1 | 8/2003 | Malamud et al. | 715/715 |
| 6,907,580 | B2 * | 6/2005 | Michelman et al. | 715/856 |
| 7,058,902 | B2 | 6/2006 | Iwema et al. | 715/810 |
| 7,290,218 | B2 * | 10/2007 | Hawkins | 715/810 |
| 2002/0013809 | A1 * | 1/2002 | Hashimoto et al. | 709/203 |
| 2004/0264782 | A1 * | 12/2004 | McKnight et al. | 382/229 |
| 2005/0039141 | A1 * | 2/2005 | Burke et al. | 715/810 |
| 2006/0149769 | A1 | 7/2006 | McCormack et al. | 707/101 |
| 2006/0218502 | A1 | 9/2006 | Matthews et al. | 715/779 |

OTHER PUBLICATIONS

"Direct Access to Contained Objects via Pop-up (Context Menus)", by James et al., published Dec. 1, 1993, pp. i, 167, 168.
"Microsoft Windows XP fast & easy" by Diane Koers,published by Premier Press in 2002, pp. i, ii, 37, 119, 120, 125, 130, 150, 152, 264, 265.
"Command Line Parameters Context Menu Extension", by Nick Carruthers, last updated May 9, 2000, taken from http://www.codeproject.com/KB/shell/cmdlineext.asprx.*

* cited by examiner

*Primary Examiner*—Rachna Desai
*Assistant Examiner*—Gregory A Distefano
(74) *Attorney, Agent, or Firm*—Kenyon & Kenyon LLP

(57) ABSTRACT

In an icon-based computer interface, a context menu includes a command line prompt for entry of textual parameter data for application programs. Computer operators may enter textual parameter data for the application via the command line prompt and launch the application corresponding to the icon in a manner that is determined by the parameter data.

27 Claims, 5 Drawing Sheets

100

200

300

300

400

500

600

700

COMMAND LINE PROVIDED WITHIN CONTEXT MENU OF ICON-BASED COMPUTER INTERFACE

BACKGROUND OF THE INVENTION

The present invention relates to a command interface for use in an icon-driven computer interface in which an operator enters textual parameter data to control operation of a selected application or other computer software element.

Graphical user interfaces ("GUIs") have simplified operation of computer devices and, particularly, general purpose computers over the past several years. When compared with textual command systems, for example, Microsoft MS-DOS and others, GUIs provide an intuitive system for computer interaction that involves substantially less operator training. One such GUI represents computer applications, user data and network resources as icons, which are displayed in various workspaces maintained by the computer. To interact with an application, data or resource, an operator typically points on its corresponding icon using an input device such as a mouse and clicks upon it using a command button. An operating system of the computer identifies from the position of a pointing cursor and the command button actions one of set of possible commands and invokes functionality that is associated with the command. These 'point and click' techniques are used throughout modern computer systems.

While icon-based interfaces are intuitive and provide a convenient interface particularly for unsophisticated operators, they have some disadvantages. There are a limited number of commands that may be performed on an icon. Conventionally, the computer system interprets a single click of a primary command button on the icon as a command to select the icon. The computer system interprets a 'double-click' upon an icon (a pair of clicks entered in quick succession) as a command to open the corresponding application, data or resource. The computer system interprets a 'right-click' upon the icon (typically, a click of a secondary button on a mouse) as a command to display a context menu of a limited number of predetermined commands. If an operator selects one of the entries from the context menu, the operating system invokes functionality associated therewith. In all of these techniques, however, there is a limited set of commands that can be entered through the icon. All the commands are predetermined—they cannot be altered by an operator.

Several applications are designed to execute in a variety of modes to execute differently when so commanded via 'command line parameters' that are entered by operators when starting execution of an application. Sophisticated computer users may use these command parameters to tailor the operation of these applications to their needs. Traditional icon-driven interfaces, however, provide no mechanism to permit an operator to enter command parameters via an icon. Command parameters must be entered via a traditional text-based prompt but they incur sizable overhead because operators typically must navigate the computer's file structure to find the desired application. Therefore, there is a need in the art for a mechanism that permits an operator to enter command line parameters in icon-driven interfaces, when opening applications.

DETAILED DESCRIPTION

Embodiments of the present invention provide an icon-based computer interface that, within a context menu displayed for an icon representing an application, includes a command line prompt for entry of textual parameter data for the program. Computer operators may enter textual parameter data for the application via the command line prompt and launch the application corresponding to the icon in a manner that is determined by the parameter data.

Figure 1:
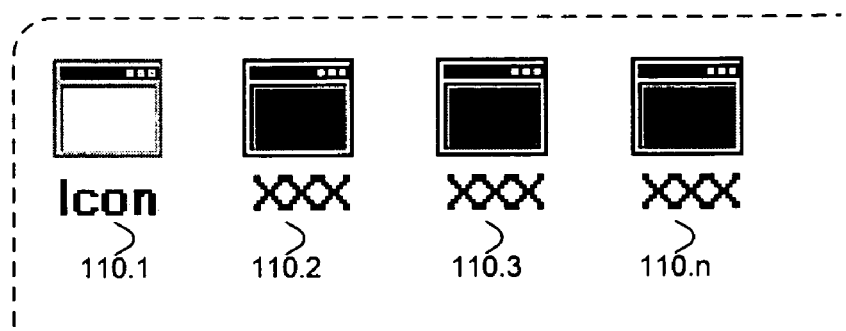
FIG. 1 illustrates a traditional workspace of an icon driven user interface for a computer system.

FIG. 1 illustrates a hypothetical workspace 100 of one such icon-driven user interface for use with a computer system. The workspace may be a desktop of the computer system, it may be view into a folder or other component of a file system or it may be a workspace dedicated to a predefined set of functionality or roles (e.g., a private workspace assigned to a network user).

For the purposes of the present discussion, it is sufficient to note that the workspace 100 includes a plurality of icons 100.1-100.n that represent programs or other functional components (collectively, "applications") of the computer system. Operators interact with the applications by placing a cursor over corresponding icons and clicking upon them.

Figure 2:
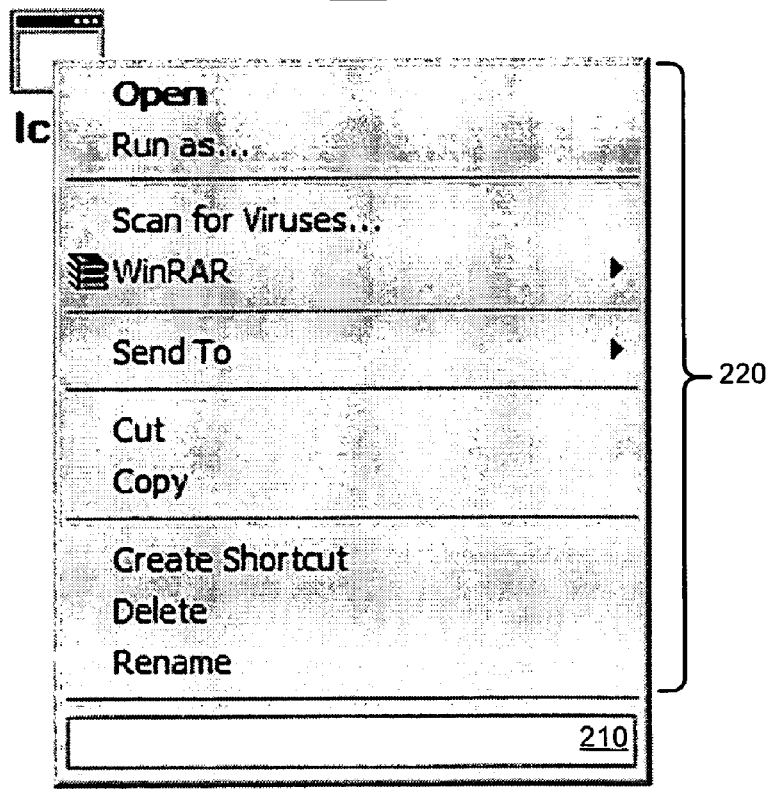
FIG. 2 illustrates a context menu according to an embodiment of the present invention.

FIG. 2 illustrates a context menu according to an embodiment of the present invention.

The context menu includes an area 210 for entry of a character-based command from an operator (called a "command line" herein). Typically, the command line is a text window provided within the context menu 200. The command line 210 may be integrated with other traditional entries within conventional context menus 200. Therefore, the command line 210 is shown in FIG. 2 in cooperation with other context menu entries 220, such as "open," "run as ...," "cut," "copy" and "create shortcut," among others. As such, the context menu 200 provides a convenient, consolidated control point for all functions to be performed with respect to the application.

The command line 210 provides an opportunity to control operation of an application, wherein an operator may enter operational parameters for the application prior to launch. Thus, the operator is not limited to default parameters for application execution that are stored in the properties record of the icon itself. The operator may enter additional operational parameters or override default parameters expressly. For example, an operator may enter operational parameters via character entry. When the parameter information is complete, an operating system of the computer system interprets the parameter information and opens the application to which the icons belongs as dictated by the operational parameters.

Significantly, the operator need not enter full operational information for the application. For example, in traditional text command systems (those provided by MS-DOS or other character-based interfaces), to launch an application an operator was required to find an application within a computer's file system, either to reference it from some other location within the file system or to open the directory in which the application resided. No such overhead is required by the foregoing embodiments of the present invention. Data representing the location of the application and a run space of the application may be stored in a properties record of the application itself. The operator need only enter data representing those operational parameters that the operator desires to implement. Thus, the command line system of the present invention provides for complete control of an application but it avoids the overhead that formerly were required of text-oriented command interfaces.

Figure 3:
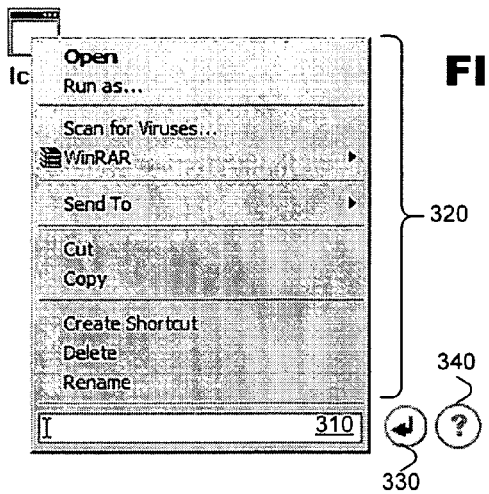
FIGS. 3(a) and 3(b) illustrate context menus according to another embodiment of the present invention.
Figure 3:
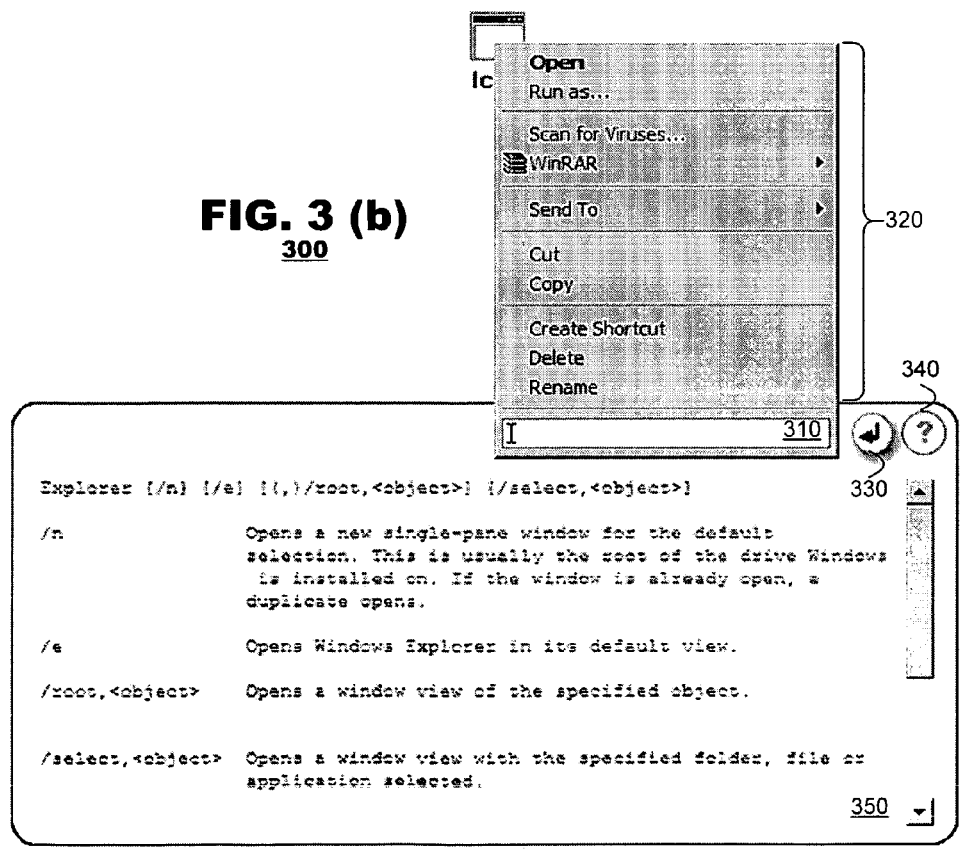

FIGS. 3(a) and 3(b) illustrate a context menu 300 according to another embodiment of the present invention. There, the context menu 300 is shown as including a command line 310 integrated with other entries 320 of the context menu 300. The context menu also includes other graphical command buttons 330, 340 to further enhance operation of the command line 310 interface. Although these command buttons 330, 340 may be displayed whenever the context menu 300 is displayed, in other embodiments the command buttons 330, 340 may be displayed after an operator has clicked within the area of the command line 310 and a cursor is provided for entry of the command line text.

A first command button 330 is illustrated as a carriage return symbol. When an operator has completed entry of parameter information within the command line window 310, the operator may click on the return command button 330 to launch the selected application. This provides an alternative mechanism for launching an application rather than pressing return button through a text-based character entry interface (e.g., keyboard).

A second command button 340 is illustrated as a help symbol. When an operator clicks upon the help button 340, an operating system may open a secondary window 350 (FIG. 3(b)) and may display parameter commands that are valid for the selected icon. The contents of the help window 350 may guide an operator to assist him in selecting parameters that are appropriate for the operating scenario he expects. By providing the help window 350 as an adjunct to the context menu 300, the help window 350 is conveniently positioned in a location of the workspace that makes the window 350 simple to review and facilitates entry of parameter commands into the command line 310 of the context menu. When the operator launches the application, for example by entering return or clicking upon the return command button 330; the operating system may remove both the context menu 300 and the help window 350 from the workspace display.

As illustrated, the help window 350 need not be sized to display all parameter commands simultaneously. It may work cooperatively with other display techniques that are conventional to graphical user interfaces to permit an operator, for example, to scroll text within a window, to page up or down or to cycle through predefined pages of displays as may be convenient to browse through arrays of text that are larger than a display window.

Figure 4:
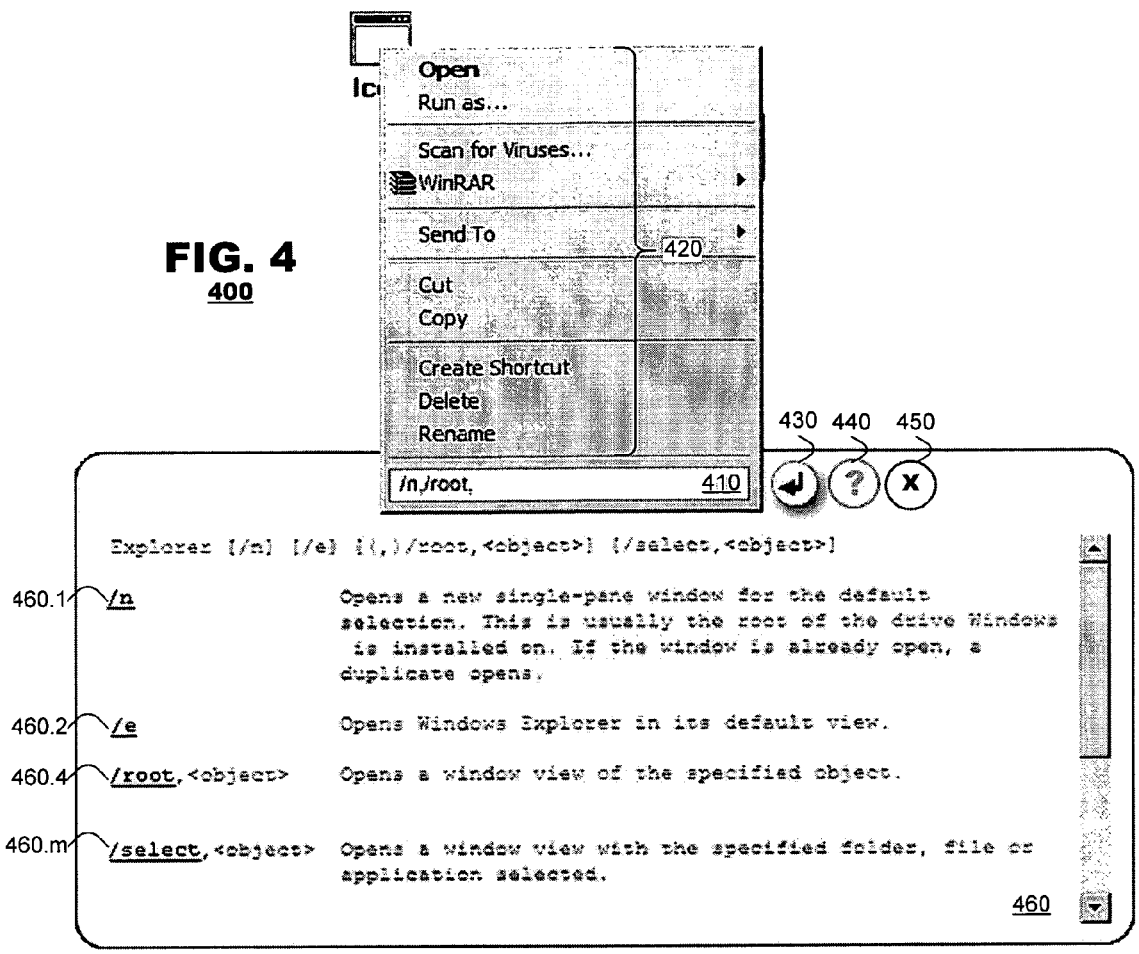
FIG. 4 illustrates a context menu according to another embodiment of the present invention.

FIG. 4 illustrates a context menu 400 according to another embodiment of the present invention. In this embodiment, the context menu 400 includes an entry for a command line 410 and other menu commands 420. Command buttons 430-450 are shown in association with the command line 410, one 440 of which opens an associated help window 460 that displays command parameters 460.1-460.m that govern execution of the application. In this embodiment, the help window may be interactive. When an operator selects any of the parameters 460.1-460.m by, for example, clicking upon a corresponding parameter, the parameter may be added to the command line. Some compound parameters require entry of additional fields to govern their operation (see, for example, the "/root" and "/select" parameters in FIG. 4). When the compound parameter is selected, they may be added to the command line with field placeholders to indicate to the operator what missing information must be added to complete the command.

In an embodiment, parameters 460.1-460.m that can be added to the command line are distinguished visually from other information in the help window via font, color or other effects to identify the parameters as interactive elements of the help window.

Optionally, once an operator begins to enter text within a context menu 400, the operating system may maintain the context menu 400 in a persistent state until the text entry is completed or it is expressly canceled by an operator. For example, conventionally, many operating systems remove a context menu from display if an operator clicks anywhere in the workspace that is outside an area occupied by the context menu. While convenient for other techniques, this technique may be disadvantageous for use with the present invention because inadvertent errors may cancel a data entry operation prematurely. In this embodiment, the context menu 400 may be held in a persistent state until the operator launches the application or cancels the data entry process. Cancellation may be indicated through a command button 450, by entering an escape code through a keyboard or through some other appropriate command.

Alternatively, the persistent state may be triggered only if an operator has entered text within the command line 410. If, for example, an operator merely clicks within the command line 410 and clicks outside the context menu 400 without having entered text within the command line 410, the context menu 400 need not be made persistent. The operating system may remove display of the context menu according to convention techniques.

Figure 5:
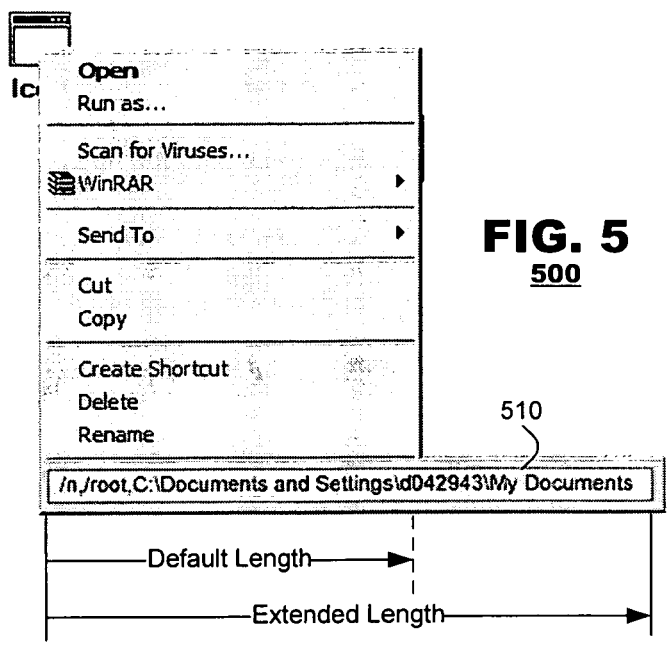
FIG. 5 illustrates a context menu according to a further embodiment of the present invention.
Figure 6:
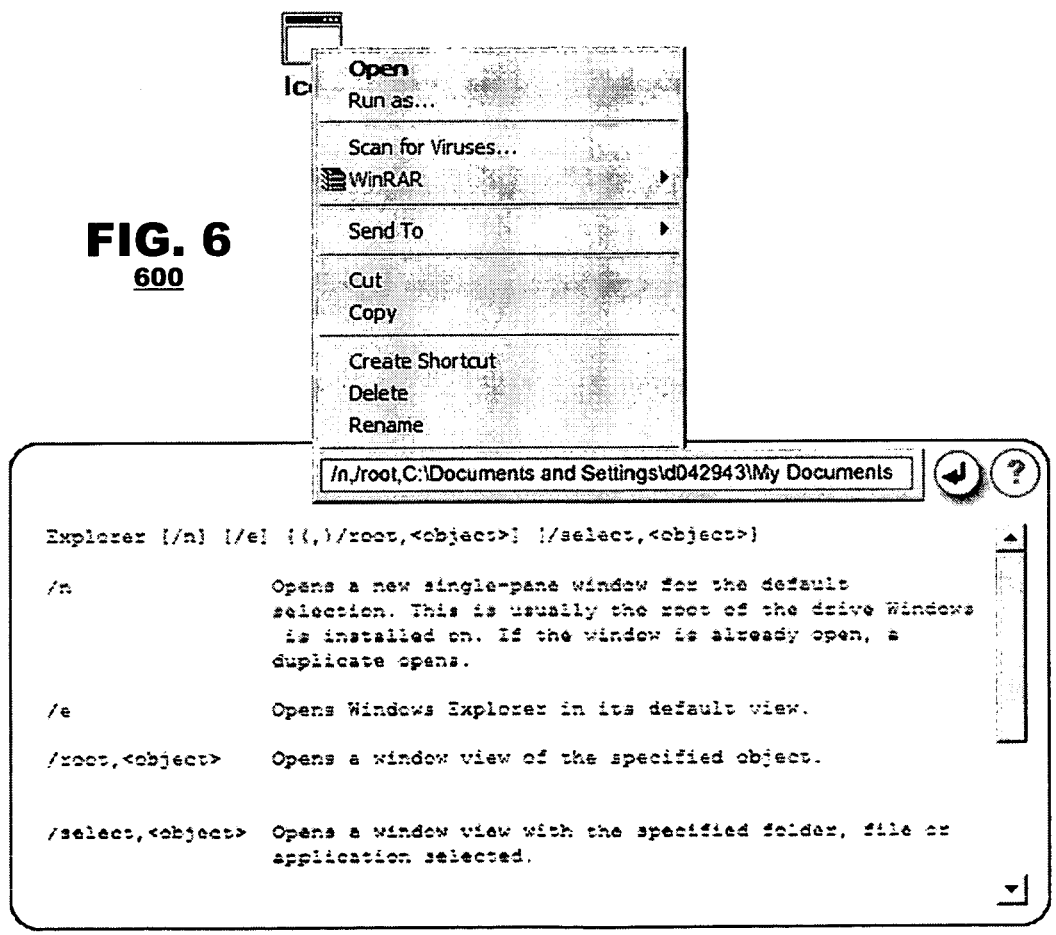
FIG. 6 illustrates a context menu according to another embodiment of the present invention.

FIG. 5 illustrates a context menu 500 according to another embodiment of the invention. Here, the context menu 500 is shown to include a command line 510 that extends to include whatever command parameters are entered therein by an operator. At time, it may be appropriate to reference other objects of a computer system by its path in the computer's file system. This can lead to extensive text entry. In such a case, the command line 510 may extend from a default length that is presented with the command line is empty of text (see, FIG. 2) to an extended length that is sufficient to display all text entered by an operator. As appropriate, the location of the context menu (or the command line itself) may vary as additional text is entered to maintain the command line 510 in a visible area of the workspace. In other words, if the extended command line 510 would pass beyond a viewable limit of the display, the command line may be shifted laterally within the workspace to keep the extended edge of the command line 510 within the viewable area of the display (example not shown). The extendable command line 510 may be used regardless of with the help window is enabled or not (see, FIGS. 5 and 6). Alternatively, or in combination with the above, the extendable command line may wrap text therein to a second line to accommodate large text.

Figure 7:
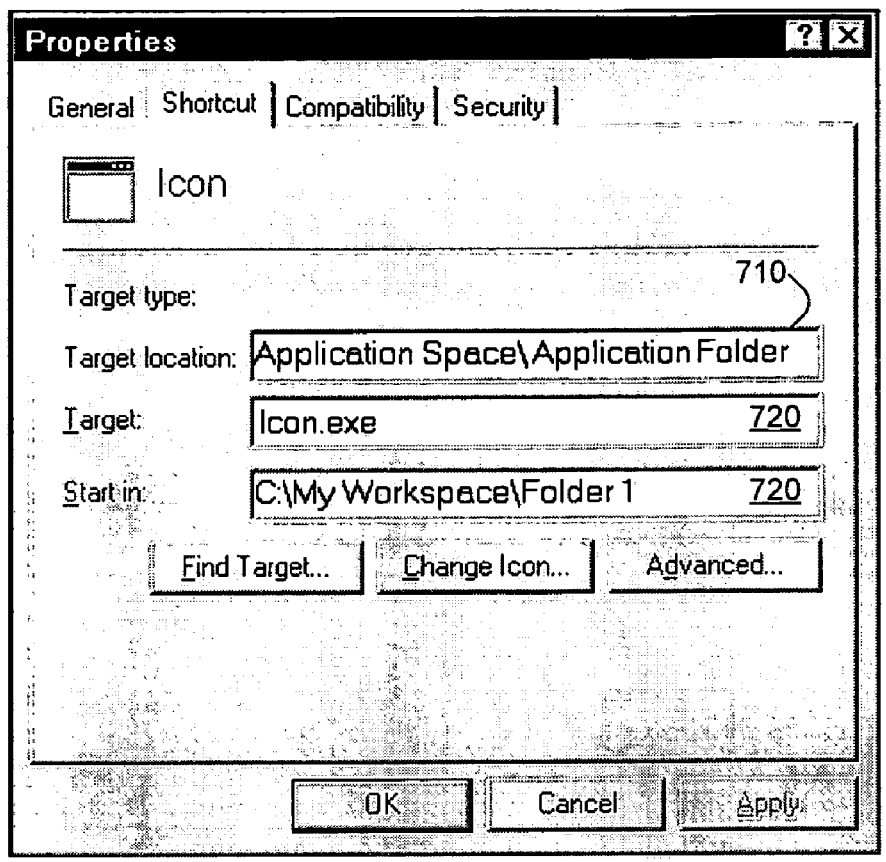
FIG. 7 illustrates a properties record suitable for use with the present invention.

As noted above, the foregoing embodiments provide a convenient protocol for controlling application execution because it retains several benefits of icon-driven interfaces. Icons traditionally are supported by properties records that identify applications to which they correspond and that define workspaces on the computer system in which the applications should execute. FIG. 7 illustrates a simplified properties record 700 that stores such information. For example, the record 700 illustrates a 'target location' field 710 that identifies a location in the file system where the application may be located. A target field 720 identifies a filename of the application itself. A 'start in' field 730 identifies a workspace within a file system where the application should execute (files within this workspace are local to the application). As noted, an operator may enter certain command parameters that supplement or override such settings, for example, the contents of the 'start in' field 730.

As described herein, the command line of the foregoing embodiment may be provided as a component of an operating system such as the commercially prevailing operating systems from Microsoft, Linux and Palm. General purpose computing platforms such a personal computer, computer servers, workstations, notebook computers, tablet computers and personal digital assistants each execute an operating system to handle basic input/output functions, among other things. As noted, the foregoing embodiments of the invention find application with any such computing device that accepts both character inputs and input via pointing devices such as computer mice, trackballs, computer styli and touch pads. Character data may be input via electromechanical keyboards (or keypads) or via keyboard facsimiles such as those provided by PDAs and other devices with small form factors.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A computer system, comprising:
    a display device, and
    a processor to execute program instructions representing a graphical user interface, to be rendered on the display device, the graphical user interface comprising:
        a plurality of icons, and
        a context menu that, when opened with respect to an icon that represents a computer program, includes a command line entry for textual input of program parameters for the computer program,
        wherein the context menu ordinarily is not persistent but becomes persistent when a text entry process is performed by an operator in the command line entry,
        wherein the context menu remains persistent until the operator commands the processor to launch the application or cancels the text entry process,
    the processor further to execute the computer program using program parameter(s) entered via the command line entry.

2. The computer system of claim 1, wherein the graphical user interface displays the context menu when the operator points to the icon that represents the computer program and enters a command via a secondary command button.

3. The computer system of claim 2, wherein the graphical user interface selects the icon when the operator points to the icon that represents the computer program and enters a command via a primary command button.

4. The computer system of claim 1, wherein the graphical user interface displays a help window in association with the context menu, the help window listing candidate command parameters that are valid for the computer program.

5. The computer system of claim 4, wherein the graphical user interface displays a command button in association with the command line entry to selectively display the help window.

6. The computer system of claim 4, wherein the graphical user interface
    identifies the candidate command parameters listed in the help window as being interactive, and
    enters one of the candidate command parameters from the help window in the command line when the operator interacts with a corresponding one of the command parameters from the help window.

7. The computer system of claim 1, wherein the graphical user interface extends a length of the command line entry to accommodate a length of text entered therein by the operator.

8. The computer system of claim 1, wherein the entered program parameter entered via the command line entry supplements default operational parameters for execution of the computer program.

9. The computer system of claim 1, wherein the entered program parameter is an operational parameter that overrides a default operational parameter for execution of the computer program.

10. A method of controlling operation of a program, comprising:
    responsive to user interaction with an icon displayed via a graphical user interface, displaying a context menu in association with the icon,
    wherein, if the icon represents a computer program, the context menu includes a command line prompt for entry of textual parameter data for the computer program,
    wherein the context menu ordinarily is not persistent but becomes persistent when a text entry process is performed by the user in the command line,
    wherein the context menu remains persistent until the user launches the application or cancels the text entry process;
    interpreting the textual parameter data as at least one operational parameter; and executing the computer program in conformance with the at least one operational parameter.

11. The method of claim 10, further comprising displaying the context menu in response to user input entering a command via a secondary command button while a cursor is located over the icon.

12. The method of claim 11, further comprising executing the computer program according to default parameters in response to a double click of a primary command button while the cursor is located over the icon.

13. The method of claim 10, further comprising displaying a help window in association with the context menu, the help window listing command parameters that are valid for the computer program.

14. The method of claim 13, further comprising displaying a command button in association with the command line entry to selectively display the help window.

15. The method of claim 13, further comprising
    displaying command parameters listed in the help window in a manner to indicate they are interactive, and
    adding one of the command parameters in the command line in response to a user selection of a corresponding command parameter from the help window.

16. The method of claim 10, further comprising extending a displayed length of the command line entry to accommodate a length of text entered therein by the user.

17. The method of claim 10, wherein the at least one operational parameter supplements default operational parameters for execution of the computer program.

18. The method of claim 10, wherein the at least one operational parameter is an operational parameter that overrides a default operational parameter execution of the computer program.

19. Computer readable storage medium having stored thereon program instructions that, when executed by a processing device, cause the processing device to maintain a graphical user interface that:
  displays a plurality of icons;
  displays a context menu that, when opened with respect to an icon that represents a computer program, includes a command line entry for program parameters for the computer program,
    wherein the context menu ordinarily is not persistent but becomes persistent when a text entry process is performed by an operator in the command line entry,
    wherein the context menu remains persistent until the operator launches the application or cancels the text entry process;
  accepts textual data in the command line representing a selected program parameter; and
  executes the computer program using the selected program parameter entered in the command line.

20. The storage medium of claim 19, wherein the graphical user interface displays the context menu in response to user input entering a command via a secondary command button while a cursor is located over the icon.

21. The storage medium of claim 20, wherein the graphical user interface selects the icon in response to a double click of a primary command button while the cursor is located over the icon.

22. The storage medium of claim 19, wherein the graphical user interface displays a help window in association with the context menu, the help window listing command parameters that are valid for the computer program.

23. The storage medium of claim 22, wherein the graphical user interface displays a command button in association with the command line entry to selectively display the help window.

24. The storage medium of claim 22, wherein the graphical user interface:
  identifies the command parameters listed in the help window as being interactive, and
  enters one of the command parameters in the command line when the operator interacts with a corresponding one of the command parameters from the help window.

25. The storage medium of claim 19, wherein the graphical user interface extends a length of the command line entry to accommodate a length of text entered therein by the operator.

26. The storage medium of claim 19, wherein the selected program parameter supplements default operational parameters for execution of the computer program.

27. The storage medium of claim 19, wherein the selected program parameter is an operational parameter that overrides a default operational parameter for execution of the computer program.

* * * * *